United States Patent [19]

Pfeffer

[11] 4,110,214

[45] Aug. 29, 1978

[54] DRAINAGE DEVICE FOR PARTICULATE MATERIAL

[75] Inventor: Johann Baptist Pfeffer, Johannesburg, South Africa

[73] Assignee: S.A. Block & Concrete (Proprietary) Limited, Alberton, South Africa

[21] Appl. No.: 745,768

[22] Filed: Nov. 29, 1976

[30] Foreign Application Priority Data

Dec. 1, 1975 [ZA] South Africa .................. 75/7534

[51] Int. Cl.$^2$ ............................................. B01D 33/00
[52] U.S. Cl. ........................................ 210/77; 210/330; 198/859
[58] Field of Search ................... 214/12, 13, 14, 15 R, 214/15 B, 15 E; 198/702, 803, 859; 37/189, 190, 69, 70; 209/147, 198, 247, 270, 279, 84, 294; 210/77, 248, 272, 402–404, 324, 270, 330

[56] References Cited

U.S. PATENT DOCUMENTS

| 1,318,264 | 10/1919 | Carpenter | 209/270 X |
| 3,263,316 | 8/1966 | Schrader | 198/859 X |
| 3,625,383 | 12/1971 | Puretc | 214/15 E X |
| 3,819,065 | 6/1974 | Tomizawa et al. | 214/14 |

FOREIGN PATENT DOCUMENTS

| 1,261,093 | 2/1968 | Fed. Rep. of Germany | 214/10 |
| 33,404 | 8/1934 | Netherlands | 214/14 |
| 64,366 | 1/1942 | Norway | 214/12 |

*Primary Examiner*—Frank E. Werner
*Attorney, Agent, or Firm*—Karl W. Flocks

[57] ABSTRACT

A drainage device for particulate material in liquid suspension is in the form of a rotating wheel having circumferentially spaced foraminous buckets scooping out liquid and suspended particulate material from a vessel. Rotation of the wheel about its axis takes place in arcuate steps by the operation of a pair of axially spaced plunger and cylinder assemblies engaging alternately in cyclic fashion with shoulders circumferentially spaced about the wheel axis.

10 Claims, 6 Drawing Figures

DRAINAGE DEVICE FOR PARTICULATE MATERIAL

This invention relates to a drainage device for particulate material contained in a body of liquid. Such a device may also be used for concentrating or thickening particulate material in liquid suspension. Thus, the term 'drainage device' is intended also to cover concentration and thickening devices.

More particularly, the invention relates to a drainage device comprising a bucket wheel having a plurality of circumferentially spaced foraminuous buckets. In operation, when the bucket wheel rotates, the buckets in succession scoop out quantities of liquid having solids in suspension. The liquid drains away and the solids remain in the buckets and are later discharged before the buckets enter the liquid again.

It is an object of this invention to provide a drainage device comprising a bucket wheel and which is robust and of inexpensive construction and reliable in operation.

According to the invention, in a drainage device comprising a bucket wheel, there is provided the method of rotating the bucket wheel in a plurality of successive arcuate steps by exerting high torque moments cyclically in succession on the bucket wheel about its axis.

The number of steps per revolution may lie within the range ten to forty inclusive. The moments may be exerted by means of at least one plunger and cylinder assembly using a working fluid under pressure, the assembly being adapted to perform working and return strokes in cyclic fashion.

The invention extends also to a drainage device which comprises a bucket wheel, and drive means capable of exerting a high torque and being adapted to rotate the bucket wheel in a plurality of successive arcuate steps about its axis by exerting moments cyclically in succession on the bucket wheel about its axis.

The drive means may include a pair of plunger and cylinder assemblies operable alternately in succession by a working fluid under pressure to perform working and return strokes, each assembly having a head arranged to engage cyclically on working strokes with mating formations which are fast with the wheel and which are spaced circumferentially about the bucket wheel axis, each head being arranged to exert a high torque on such wheel on each working stroke. The mating formations may be provided in circumferentially spaced staggered relationship on opposite sides of the wheel.

Each plunger and cylinder assembly at the end of a return stroke, may be arranged to operate a valve causing working fluid under pressure to be admitted to its cylinder.

The device may include a vessel, the bucket wheel being mounted over the vessel so that in operation it can enter into a body of liquid contained in the vessel.

The invention will now be described by way of example, with reference to the accompanying drawings.

Figure 1:
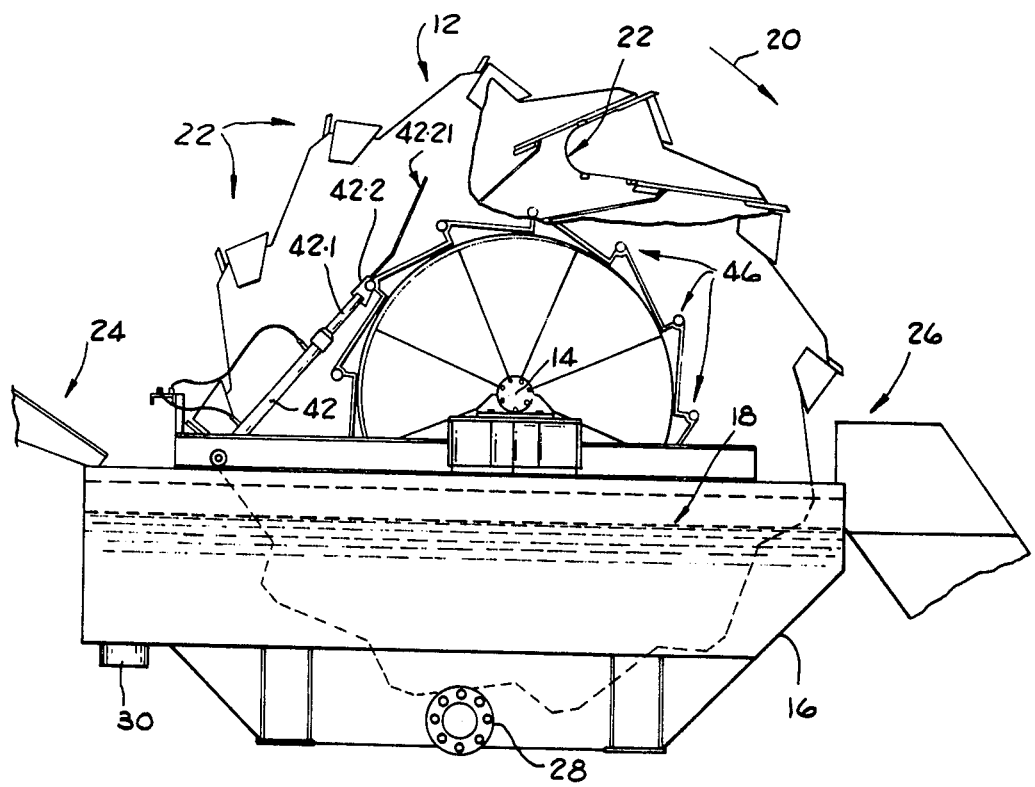
FIG. 1 shows a side elevation of a drainage device according to the invention.
Figure 2:
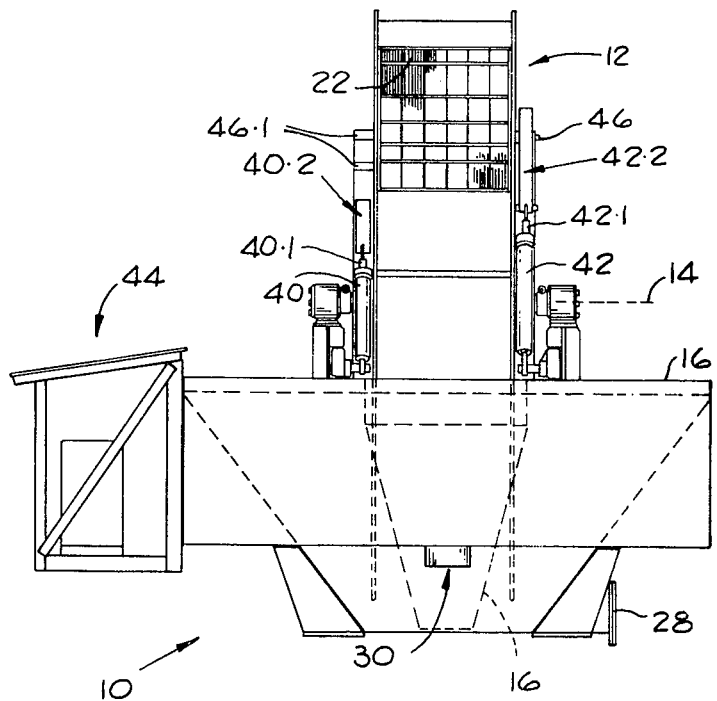
FIG. 2 shows a rear end view corresponding to FIG. 1.
Figure 3:
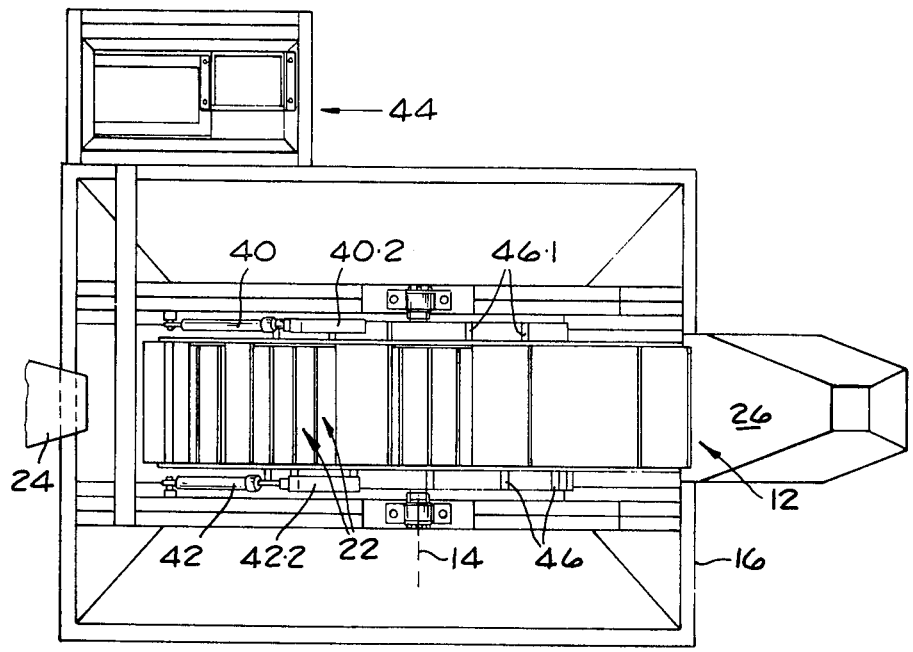
FIG. 3 shows a plan view corresponding to FIGS. 1 and 2.

Referring to the drawings, reference numeral 10 refers generally to a drainage device in accordance with the invention. It comprises a bucket wheel 12 mounted to rotate about an axis 14 over a vessel 16 adapted to contain a body of liquid to a level 18. The wheel is arranged to rotate about its axis in the direction of arrow 20. The rate of rotation is only about one revolution per minute.

The bucket wheel has a plurality of foraminous buckets 22 having their mouths directed circumferentially about the wheel axis, in the direction of rotation as indicated by arrow 20. The buckets are arranged to dip into the body of liquid to scoop up liquid and material from the vessel 16.

The body of liquid is fed into the vessel 16 by means of a feed chute or launder 24. The liquid carrying particulate material in suspension, is scooped up by the foraminous buckets, and the particulate material is retained within the buckets while the liquid drains away. The particulate material is then discharged into a discharge chute 26 which can then carries the particulate material away, either by conveyor belt or other means, for further processing.

The vessel is provided with a drain opening 28 for periodic cleaning. It also has an overflow 30 to take care of excess flow into the vessel.

Figure 4:
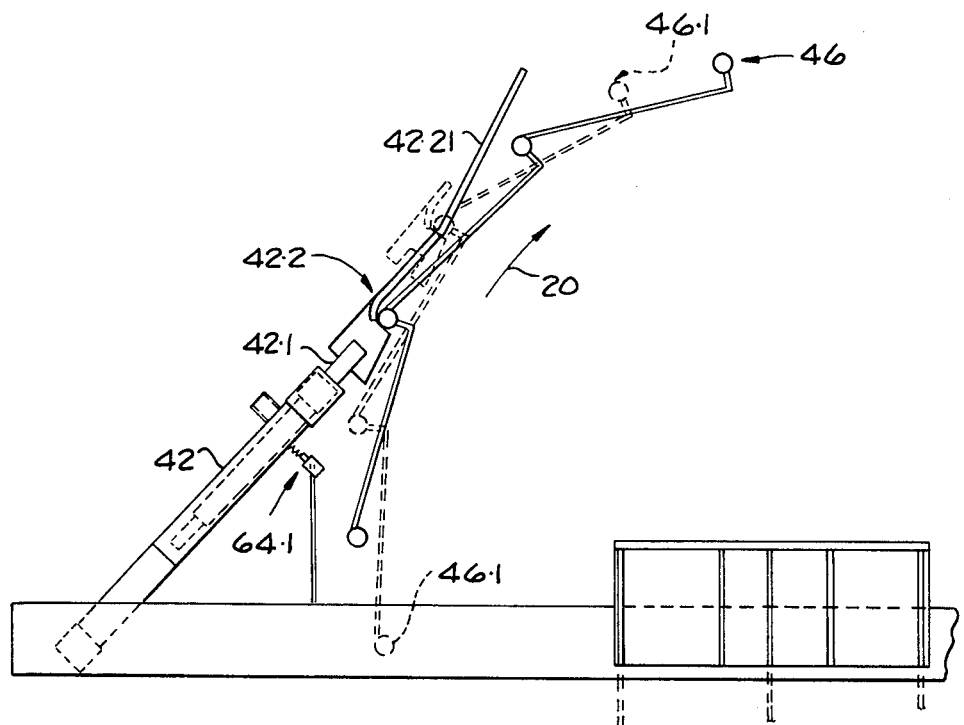
FIG. 4 shows a detail side elevation of the drive means.

The drive means for rotating the wheel about its axis in the direction of arrow 20, comprises a pair of plunger and cylinder assemblies 40 and 42 operable by a working fluid under pressure provided by a hydraulic pump and motor assembly 44, the plungers 40.1 and 42.1 have shaped heads 40.2 and 42.2 adapted to engage with mating formations 46 and 46.1 fast with the bucket wheel and spaced circumferentially about the bucket wheel axis. The mating formations 46.1 and 46 on opposite sides of the bucket wheel are arranged in staggered relationship as shown in FIG. 4 of the drawings.

The head 42.2 of the plunger and cylinder assembly 42 is provided with a tongue 42.21 to hold it up and away from the switch 64.1 the operation of which will be described hereafter. The head 40.2 is provided with a similar tongue.

Figure 5:
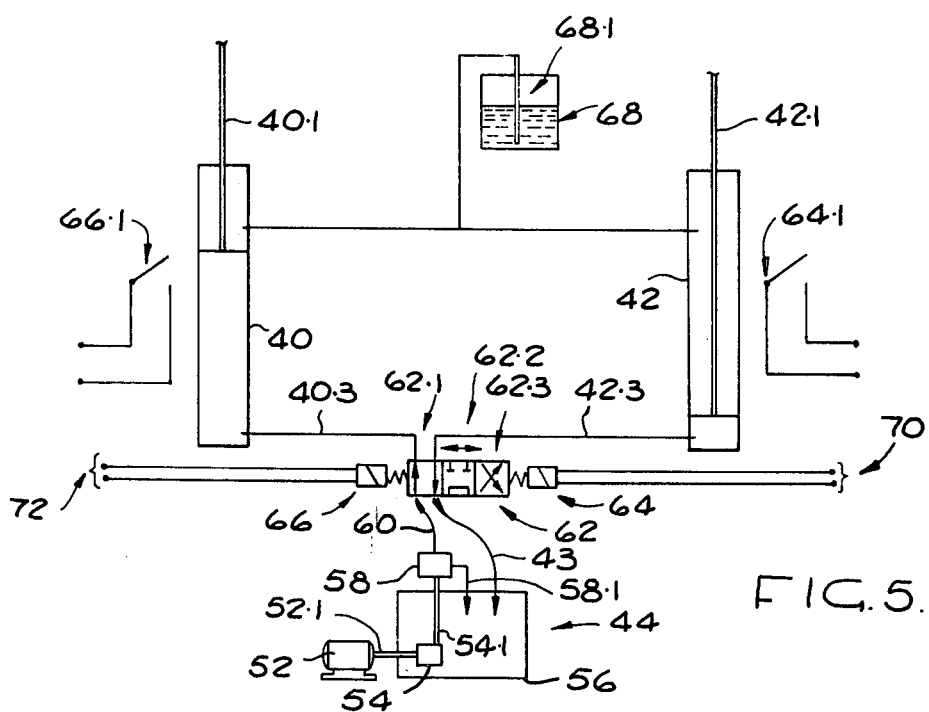
FIG. 5 shows schematically the flow diagram for the working fluid of the drive means.

Referring to FIG. 5, the pump and motor assembly 44 comprises an electric motor 52, a pump 54, and a reservoir 56, for containing hydraulic fluid. The electric motor 52 drives the pump 54 by means of a drive shaft 52.1. The pump has a delivery pipe 54.1 leading into a pressure-relief valve 58. The pressure-relief valve has a pressure relief overflow conduit 58.1 leading back into the reservoir 56. A conduit 60 leads from the pressure-relief valve 58 to a control valve assembly, generally indicated by reference numeral 62. The control valve 62 is actuated by solenoids 64 and 66, which themselves are energised by switches 64.1 and 66.1.

The control valve 62 has three sections, 62.1, 62.2, and 62.3, each of which can be brought into registration independently with the pressure supply line 60 and return line 43, and with the lines 40.3 and 42.3. When solenoid valve 66 has been energized and solenoid vlave 64 de-energized, then section 62.1 comes into register with lines 60 and 43. Then high pressure fluid is supplied to cylinder assembly 40 via line 40.3, and return fluid is returned to the reservoir 56 via line 42.3.

When solenoid valve 64 is energized and solenoid valve 66 is de-energized, then section 62.3 comes into register and the reverse takes place. And when neither of the solenoid valves is energized, section 62.2 is in register with lines 60 and 43, and the high pressure fluid is returned directly to the reservoir 56.

In the position shown in FIG. 5, the switch 66.1 has been actuated and accordingly the solenoid 66 has been energised. This has resulted in the control valve 62 being in a position to admit hydraulic fluid under pressure from the delivery conduit 60, via the conduits 40.3 into the cylinder 40. The hydraulic fluid in the top of the cylinder 40 is discharged into a pressure vessel 68 which contains a pocket of air 68.1 under pressure. This pocket of air 68.1 causes the plunger 40.1 and 42.1 to return on their return strokes. In the position shown in FIG. 5, the hydraulic fluid is discharged from the cylinder of assembly 42 via conduit 42.3, valve 62, and conduit 43 to the reservoir 56.

The plunger and cylinder assembly 42 becomes activated when the plunger 42.1 has been returned to the beginning of a working stroke (i.e. at end of return stroke) as shown in FIG. 5 of the drawings, and when the displacement of the mating formations 46.1 by the head 40.2 on the other side of the wheel, has extended far enough for the tongue 42.21 to drop sufficiently to clear the mating formations 46, thereby permitting the cylinder of assembly 42 to drop onto the switch 64.1 and thereby to energise the solenoid 64 so as to bring the control valve 62 into position such that hydraulic fluid can be admitted via conduit 42.3 to activate the plunger and cylinder assembly 42.

Both the switches 64.1 and 66.1 are shown in the open position. It is to be understood that both of them need to be closed for only a moment in order to energise the respective solenoids 64 and 66, whereupon such solenoids, when energised, will remain energised over a latch relay. The solenoids 64 and 66 are energisable from a source of power not shown, via leads 70 and 72 respectively. For further details regarding the energising of the solenoids, reference is made to FIG. 6 of the drawings.

Figure 6:
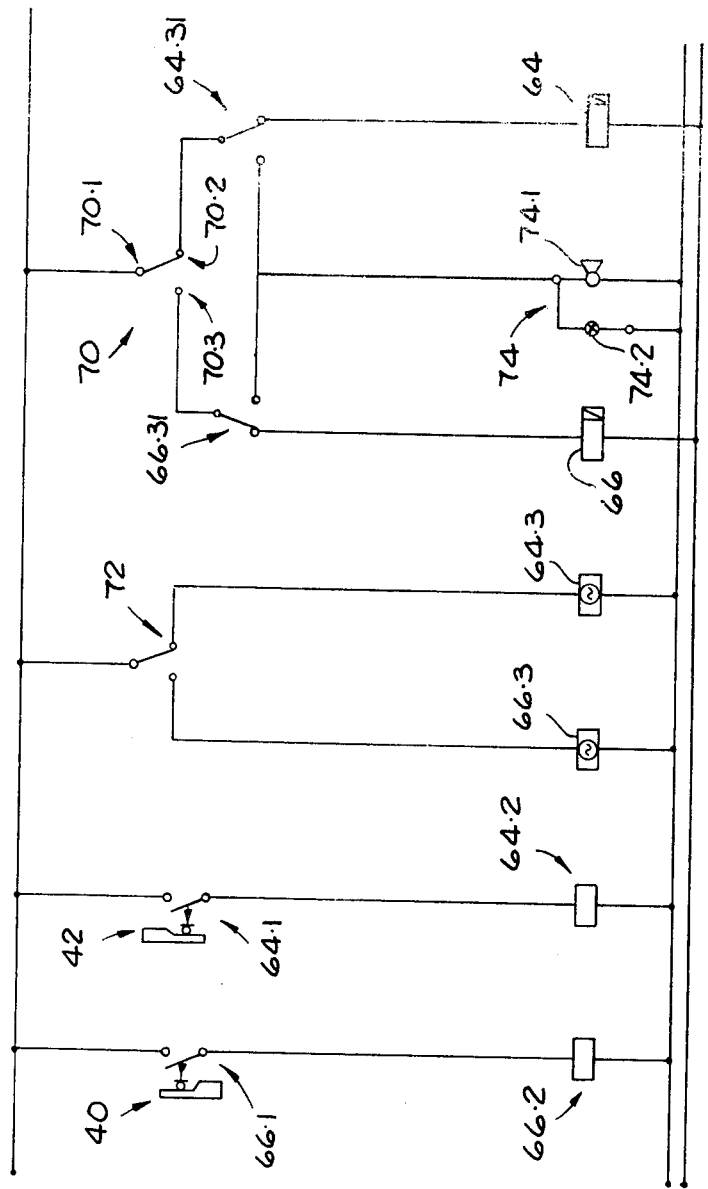
FIG. 6 shows schematically the energizing circuit diagram for the drive means.

Referring to FIG. 6 of the drawings, the limit switches 64.1 and 66.1 are urged in the direction of the arrows and are arranged to energise the coils 64.2 and 66.2 of a latch relay having contacts 70 for energising the solenoids 64 and 66. When limit switch 64.1 is operated and contact is made across contacts 70.1 and 70.2, then solenoid 64 is energised and solenoid 66 is de-energised. At some stage during the working stroke of the plunger 42.1, the cylinder 40 drops and operates the limit switch 66.1. Then contact between contacts 70.1 and 70.2 is broken and contact between contacts 70.1 and 70.3 is made, thereby energising solenoid 66 and de-energising solenoid 64.

Simultaneously with the energising of the solenoids 64 and 66 there are energised over contacts 72 the coils 64.3 and 66.3 of timing relays having contacts 64.31 and 66.31 respectively in series with solenoid coils 64 and 66. The contacts 72 operate simultaneously with the contacts 70. In the position shown, the timer relay coil 64.3 is energised. If there is a delay longer than set for the plunger 42.1 to be displaced fully in operation, then the relay contacts 64.31 will be operated by coil 64.3, thereby de-energising the solenoid 64 and energising an alarm circuit 74 comprising a hooter 74.1 and a light 74.2 connected in parallel with each other. The operation of coil 66.3 and contacts 66.31 and contacts 72 is similar.

In this way the solenoids 64 and 66 are energised alternately. The time taken for the cylinders 42 and 40 to complete their working strokes, must not be longer than periods set on the timer relays whose coils 64.3 and 66.3 operate the contacts 74.31 and 66.31 if such periods are exceeded. The timer relays may be set to operate after a period of 15 seconds but this may be reduced if desired, to a period of 6 seconds or even less.

It is an advantage of this invention that a relatively high torque is obtainable to get the bucket wheel started after a period of stoppage and when the particulate material may have settled and may be holding the wheel. It is thus possible to get the wheel started again after a period of stoppage, without much trouble and with less chance of overloading the drive means than is possible with a reduction gear drive.

What I claim is:

1. A drainage device for scooping liquids and solids in suspension and separating the solids from the liquid by drainage of the liquid comprising a bucket wheel having a plurality of foraminous buckets through which the liquid can drain, spaced circumferentially about its axis;

drive means to rotate said bucket wheel in a plurality of successive arcuate steps with high torque moments applied cyclically in succession on said bucket wheel at positions about and radially spaced from its axis, said drive means including a pair of axially spaced plunger and cylinder assemblies, each having a head arranged to engage cyclically on working strokes by means of up thrust high torque moments with mating formations which are fast with said bucket wheel and spaced circumferentially about the axis of said bucket wheel, and means to thrust each plunger of said plunger and cylinder assembly on its working stroke, interconnected with the operation of the other of said plunger and cylinder assemblies in alternate successive movements of said plungers.

2. A device as claimed in claim 1, in which the pair of plunger and cylinder assemblies are each biassed to an initial position at the end of its return stroke, and in which there are provided working fluid flow lines and valve means for controlling the flow of working fluid under pressure along such flow lines, to and from the plunger cylinder assemblies, each plunger and cylinder assembly being adapted at the end of its return stroke to operate the valve means, thereby to close off the supply of working fluid under pressure to the other plunger and cylinder assembly, and to open for itself the supply of working fluid under pressure to activate it on its working stroke.

3. A device as claimed in claim 2, in which the plunger and cylinder assemblies are pivotally mounted at their lower ends in inclined positions about axes parallel to the rotational axis of the bucket wheel, the operation of the valve means being adapted to take place by each plunger and cylinder assembly pivoting about its pivotal axis under gravity at the end of its return stroke.

4. A device as claimed in claim 3, in which each head has a tongue adapted to engage with the mating formations for preventing arcuate displacement of the plunger and cylinder assembly under gravity about its pivotal axis until it is at the end of its return stroke.

5. A device as claimed in claim 3, in which the valve means includes a solenoid valve operatively mounted in the working fluid flow lines, the solenoid valve being electrically energisable by the closure of switch means mounted in proximity to and operable by means of the plunger and cylinder assemblies when displaced under gravity at the ends of their return strokes.

6. A device as claimed in claim 1, in which the pair of plunger and cylinder assemblies is biassed to initial positions at the ends of their return strokes, and in which they are pivotally mounted in inclined positions about pivotal axes parallel to the bucket wheel rotational axis and spaced therefrom a distance which is greater than the spacing of the mating formations from the bucket wheel rotational axis, each plunger and cylinder assembly being arranged at the end of its working stroke to pivot about its pivotal axis under gravity, and in which there are provided working fluid flow lines and valve means for controlling the flow of working fluid under pressure along such flow lines to and from the plunger and cylinder assemblies, the valve means being operable by each plunger and cylinder assembly when it pivots under gravity at the end of its return stroke, thereby to close off the supply of working fluid under pressure to the other plunger and cylinder assembly, and to open for itself the supply of working fluid under pressure to activate it on its working stroke.

7. A device as claimed in claim 1, in which the plunger and cylinder assemblies are each biassed to an initial position at the end of its return stroke; in which the working fluid under pressure is hydraulic fluid; in which there are provided a hydraulic fluid reservoir, and a hydraulic pump having a suction connected to the reservoir and having a delivery connected via a solenoid valve and a feed-cum-return line to each cylinder of the plunger and cylinder assemblies; and in which the solenoid valve is energisable by each plunger and cylinder assembly alternately at the end of its return stroke to connect its feed line with the pump delivery and to connect the feed line of the other plunger and cylinder assembly with the reservoir, the feed line thus connected to the reservoir then being adapted to act as a return line.

8. The method of separating solids from liquids by scooping the liquids and solids in suspension and draining the liquid therefrom by rotation of a plurality of foraminous buckets spaced circumferentially about the axis of a bucket wheel comprising the steps of applying a high torque moment in an upthrusting direction cyclically on the bucket wheel at circumferentially spaced positions about and radially spaced from its axis, applying a successive intervening high torque moment, in an upthrusting direction, cyclically on the bucket wheel at circumferentially spaced positions axially spaced from the position of said previous application, and radially spaced from the axis of the bucket wheel, each of said steps of applying a high torque moment controlled to take place in conjunction with the operation of the prior step in alternate successive and repeated applications.

9. The method as claimed in claim 8, in which the high torque moments are applied by hydraulic plunger and cylinder assemblies and in which each plunger is biassed to a position which is the starting position of a working stroke.

10. The method as claimed in claim 9, in which the bias is provided by a pocket of air under pressure in a pressure vessel which is hydraulically connected to the cylinders of both plunger and cylinder assemblies.

* * * * *